US00RE45090E

(19) United States
(12) Reissued Patent
Brownlee et al.

(10) Patent Number: US RE45,090 E
(45) Date of Reissued Patent: Aug. 26, 2014

(54) CABLE TIE WITH WIDE NECK

(75) Inventors: James A. Brownlee, Minooka, IL (US); Robert J. Krisel, Manhattan, IL (US)

(73) Assignee: Panduit Corp., Tinley Park, IL (US)

(21) Appl. No.: 13/074,812

(22) Filed: Mar. 29, 2011

Related U.S. Patent Documents

Reissue of:
(64) Patent No.: 6,745,439
Issued: Jun. 8, 2004
Appl. No.: 09/855,917
Filed: May 15, 2001

(51) Int. Cl.
*B65D 63/10* (2006.01)

(52) U.S. Cl.
USPC ..... 24/16 PB; 24/30.5 P

(58) Field of Classification Search
USPC ..... 24/16 PB, 30.5 P, 16 R, 17 A, 17 AP, 24/30.5; 248/74.3; 292/318–322, 325
See application file for complete search history.

(56) References Cited

U.S. PATENT DOCUMENTS

| | | | |
|---|---|---|---|
| 3,186,047 | A | 6/1965 | Schwester et al. |
| 3,408,699 | A | 11/1968 | Reynolds |
| 3,457,598 | A | 7/1969 | Mariani |
| 3,486,200 | A | 12/1969 | Orenick |
| 3,488,813 | A | 1/1970 | Kohke |
| 3,490,104 | A | 1/1970 | Kabel |
| 4,001,898 | A | 1/1977 | Caveney |
| 4,640,319 | A | 2/1987 | Walker |
| 4,658,478 | A | 4/1987 | Paradis |
| 4,875,647 | A | 10/1989 | Takagi et al. |
| 5,146,654 | A | 9/1992 | Caveney et al. |
| 5,193,251 | A | 3/1993 | Fortsch |
| 5,263,231 | A | 11/1993 | Sorensen et al. |
| 5,317,787 | A | 6/1994 | Fortsch |
| 5,517,727 | A | 5/1996 | Bernard et al. |
| 5,517,728 | A | 5/1996 | Woods |
| D372,665 | S | 8/1996 | Kim |
| 5,630,252 | A | 5/1997 | Wells |

(Continued)

OTHER PUBLICATIONS

Office Action issued in Reexam U.S. Appl. No. 09/008,800 on Feb. 11, 2008.

(Continued)

*Primary Examiner* — Jack W. Lavinder
(74) *Attorney, Agent, or Firm* — Christopher S. Clancy

(57) ABSTRACT

A cable tie is provided that includes an integral cable tie head and strap. The strap includes a first end forming a neck section, a free end opposite the first end, and an intermediate section between the first end and the free end, the intermediate section having a predetermined width $B_1$ and thickness $T_1$ defining a predetermined cross-sectional area. The cable tie head is secured to the neck area of the strap at the first end of the strap, the cable tie head having a width E that is wider than strap width B and including a strap accepting channel containing a locking device. The strap accepting channel is sized to receive the free end of the strap. The neck section has a width that transitions from a width of B to a width E' that is substantially the same as width E and a thickness $T_2$ that is thinner than $T_1$, the neck section having a cross-sectional area that is at least substantially equal to the cross-sectional area of the intermediate section of the strap so as to have a tensile strength at least equal to a tensile strength of the intermediate section of the strap. The cable tie may be a bent neck type cable tie. Preferably, the neck section has at least one recessed channel defining the reduced thickness $T_2$ and thickened side portions.

19 Claims, 8 Drawing Sheets

(56) References Cited

U.S. PATENT DOCUMENTS

| | | | |
|---|---|---|---|
| 5,669,111 | A | 9/1997 | Rohaly |
| 5,685,048 | A | 11/1997 | Benoit |
| 5,774,944 | A | 7/1998 | Choi |
| 5,776,944 | A | 7/1998 | Choi |
| 5,781,975 | A | 7/1998 | Wells, Jr. et al. |
| 5,815,891 | A | 10/1998 | Students et al. |
| 5,890,265 | A | 4/1999 | Christian et al. |
| 6,076,234 | A | 6/2000 | Khokhar et al. |
| 6,745,439 | B2 | 6/2004 | Brownlee et al. |

OTHER PUBLICATIONS

Office Action issued in Reexam U.S. Appl. No. 09/080,800 on May 21, 2008.

Decision on Appeal issued in Reexam U.S. Appl. No. 09/008,800 on Jan. 31, 2011.

CABLE TIE WITH WIDE NECK

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates generally to an advanced neck design for cable ties.

2. Description of Related Art

Cable ties have traditionally been formed by an integral molding of a cable tie head and a cable strap. Most of these cable ties involve a design in which the elongated strap extends straight outward from the cable tie head. An example of such a conventional cable tie design is U.S. Pat. No. 3,949,449 to Caveney et al., which is represented in FIGS. 1-3.

As shown, this conventional cable tie 100 includes an elongated strap 110 extending from an integrally molded cable tie head 120. A neck area 130 is formed at the interface between strap 110 and head 120. Cable tie head 120 includes a strap accepting channel 140 that receives strap 110 and a locking device 150. In use, cable tie 100 can be wrapped around objects such as a bundle of cables 160 and locked in place as known in the art.

With such a conventional design, there is often little or no bending at the neck area 130. Rather, bending incrementally occurs throughout the length of strap 110 as apparent from FIG. 3. Most designs for this type of cable tie, including the Caveney '449 patent, have a uniform strap width B that is substantially smaller than a cable head width E. There may be a slight radiusing at the transition with cable head 120, but for the most part the neck area 130 in such designs has had the same width B and cross-section as the remainder of strap 110.

There also is known a bent neck type of cable tie, such as the one shown in FIGS. 4-9 described in copending U.S. patent application Ser. No. 09/855,262. now U.S. Pat. No. 6,530,126 the disclosure of which is incorporated herein by reference in its entirety. In such a bent neck design, cable tie 100 is again integrally formed with both a cable tie head 120 and a strap 110. However, in this design, strap 110 initially extends from head 120 along a strap attachment axis S substantially parallel to the strap passageway, and is then formed with a bend at neck section 130 such that the strap extends substantially perpendicular to the strap attachment axis S. With such a bent neck design, a more favorable position of the portion of strap 110 exiting the strap passageway after threading is achieved. This can be particularly important when the excess strap length is cut off so as to avoid a sharp edge sticking up. However, a substantial amount of the bending forces acting on cable tie 100 during use act at the bent portion. That is, to accommodate either a very small bundle of cables or a large bundle of cables, strap 110 will need to be stretched inward or outward and the forces from such stretching are concentrated at the prebent neck section 130.

The design shown in FIGS. 4-9 substantially conforms to the conventionally used notion that the neck should correspond in size to the strap. That is, strap 110 has a substantially constant overall width and thickness. Neck section 130 in this design has substantially the same width B as the strap 110 and may include a cored out bottom portion 115 that has a reduced thickness at central portions as best shown in FIG. 7. This reduction in thickness is used to increase flexibility in the neck area. However, there are several problems that may exist with such designs. First, there may be a difficulty in bending at the neck section if the neck section is not cored out. Second, there is a reduced strap strength (tensile strength) when the neck section is cored out compared to the tensile strength of the rest of the strap body. Third, there may be molding and reliability problems. Molding in such a design is achieved by a two-piece mold having a complex shape. The mold has a stepped part line (P/L) as shown with the bolded dashed line in FIGS. 6 and 8 in which the part line follows the midline of strap 110 around the bend of neck section 130 where the part line then angles down across cable tie head 120. However, for the simplest mold tooling design of a cable tie head 120 that has a width E substantially larger than the width B at the neck area (FIG. 4), there is a sharp edge and/or mismatch on the plastic part at the interface between neck section 130 and cable tie head 120. This sharp edge and mismatch can be avoided with complicated tooling, including the complicated metal mold 200 partially shown in FIG. 8. Such complicated tooling, however, has sharp edges that could be easily worn or broken.

Furthermore, for either design there is a sharp step (change in cross-section) from the transition of neck section 130 to cable tie head 120, there is a distinct potential for stress risers. As the neck section bends considerably in either direction, such stress risers can lead to part failures, particularly when brittle materials are used for the part.

SUMMARY OF THE INVENTION

It is an object of the invention to provide a cable tie with an improved neck design. The neck design allows improved flexibility and bending at the neck without reducing loop strength from that attained in the strap section. Moreover, the neck design maintains a generous edge radius that prevents cable insulation damage and allows use of a simpler mold design.

Applicants have found that the lie of a strap in a bent neck type cable tie can be improved by maximizing the radius of the neck at the bend and by improving the neck's flexibility. The strap thickness, parting line angle, and strap body edge radii limit the size of the radii that can transition from cable tie head to neck.

The general equation for the moment of inertia for a simple rectangular cross-section cable tie is $I=(B\times T^3)/12$ where B is the width of the strap and T is the thickness of the strap. The flexibility of the neck can be improved by: 1) making the strap narrower; or 2) making the strap thinner. Reducing either variable and holding the other constant would reduce the moment of inertia and thereby decrease the force to bend the part in that region. However, doing so will also decrease the area through the section ($A\approx B\times T$), which has the adverse effect of decreasing tensile strength through the section. As such, attempts to increase bending flexibility using these methods would result in reduced tensile strength, which is undesirable.

Applicants have noted that by increasing the width of the strap while decreasing the thickness, one can achieve a desired lower moment of inertia while maintaining or increasing the tensile strength (area) of the section. The magnitude of the moment of inertia can be decreased as the strap width increases by reducing the overall thickness of the part, or by creating a channel on either or both sides of the part. The channel-shaped geometry has the added advantage that a larger thickness flow path is maintained for the purpose of more easily filling out a molded part.

Applicants have also found manufacturing and use advantages to increasing of the width of the strap to match the width of the cable tie head. This provides the most desirable tooling configuration for a stepped parting line part, which may be used to create bent neck type cable ties such as those of the claimed invention. That is, a neck width that matches the head width eliminates the need for weak or complicated mold components to eliminate sharp edges or mismatches on the part. Such a design in which a neck width matches the head width also eliminates a traditional stress concentration where there is an abrupt change in cross-section.

The above and other objects are achieved by a cable tie that includes an integral cable tie head and strap. The strap includes a first end forming a neck section, a free end opposite the first end, and an intermediate section between the first end and the free end, the intermediate section having a predetermined width B and thickness $T_1$ defining a predetermined cross-sectional area. The cable tie head is secured to the neck area of the strap at the first end of the strap, the cable tie head having a width E that is wider than strap width B and including a strap accepting channel containing a locking device. The strap accepting channel is sized to receive the free end of the strap. The neck section has a width that transitions from a width of B to a width E' that is substantially the same as width E and a thickness $T_2$ that is thinner than $T_1$, the neck section having a cross-sectional area that is at least substantially equal to the cross-sectional area of the intermediate section of the strap so as to have a tensile strength at least equal to a tensile strength of the intermediate section of the strap. The cable tie may be a bent neck type cable tie. Preferably, the neck section has at least one recessed channel defining the reduced thickness $T_2$ and thickened side portions.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 10:
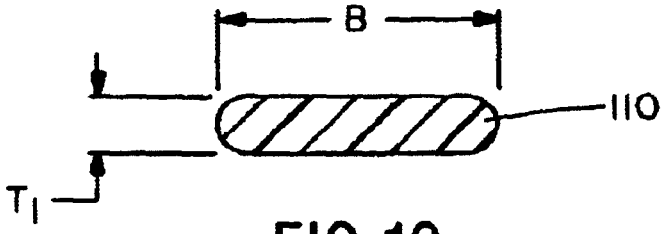
FIG. 10 is a cross-sectional view of a neck area of a conventional cable tie having a predetermined cross-sectional area.

The invention relates to a cable tie having improved flexibility at a neck section of the cable tie, which is particularly important in a bent neck type cable tie. Conventional cable ties primarily use neck cross-sections that substantially correspond to the cross-section of the strap (see FIG. 10). While this results in a neck section that has a tensile strength equal to the rest of the strap, it results in the previously described problems of bent neck cable ties with a stepped parting line.

The strap thickness, parting line angle, and strap body edge radii limit the size of the radii that can transition from cable tie head to neck in a bent neck type cable tie. The general equation for the moment of inertia for a simple rectangular cross-section cable tie is $I=(B\times T^3)/12$ where B is the width of the strap and T is the thickness of the strap. The design of FIGS. 8-9 results in a neck with limited flexibility as the neck cross-section is approximately the same as the cross-section of the strap body (shown in FIG. 10), which has a high moment of inertia. While the flexibility can be increased by the provision of a cored out bottom portion 115, this results in a reduction of tensile strength from that attained at the strap, which may be undesirable.

However, by maximizing the radius of the neck at the bend in a bent neck type cable tie and by improving the neck's flexibility, the lie of the strap can be improved. Applicants have found that by increasing the width of the strap while decreasing the thickness, one can achieve a desired lower moment of inertia ($I=B\times T^3$) while maintaining or increasing the tensile strength (area) of the section. The magnitude of the moment of inertia can be decreased as the strap width increases by reducing the overall thickness of the part, or by creating a reduced thickness channel on either or both sides of the part. The channel-shaped geometry has the added advantage that a larger thickness flow path (greater cross-sectional area) is maintained for the purpose of more easily filling out a molded part. Exemplary cross-sectional designs that can be used to achieve this result are shown in FIGS. 11-14. In all of these designs, the cross-sectional area at the neck can remain substantially the same as the area of the strap (FIG. 10), but results in a lower moment of inertia than that at the strap body to allow better flexibility in the neck area while retaining sufficient tensile strength.

Figure 11:
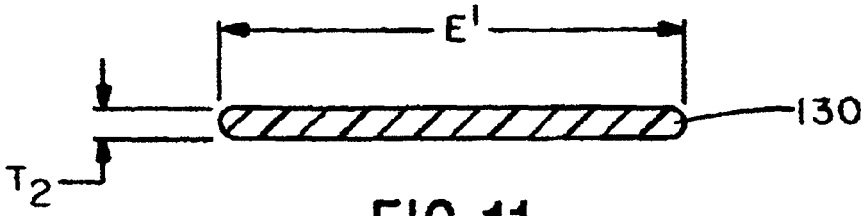
FIG. 11 is a first exemplary cross-sectional area of a neck area according to the invention.
Figure 12:
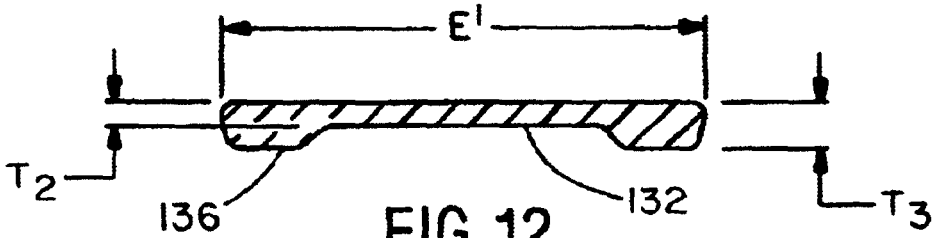
FIG. 12 is a second exemplary cross-sectional area of a neck area according to the invention.
Figure 13:
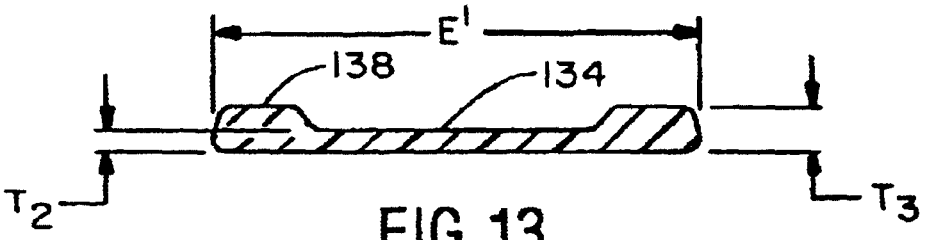
FIG. 13 is a third exemplary cross-sectional area of a neck area according to the invention.
Figure 14:
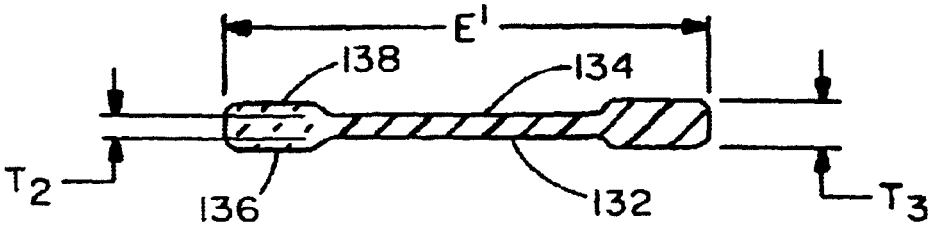
FIG. 14 is a fourth exemplary cross-sectional area of a neck area according to the invention.
Figure 15:
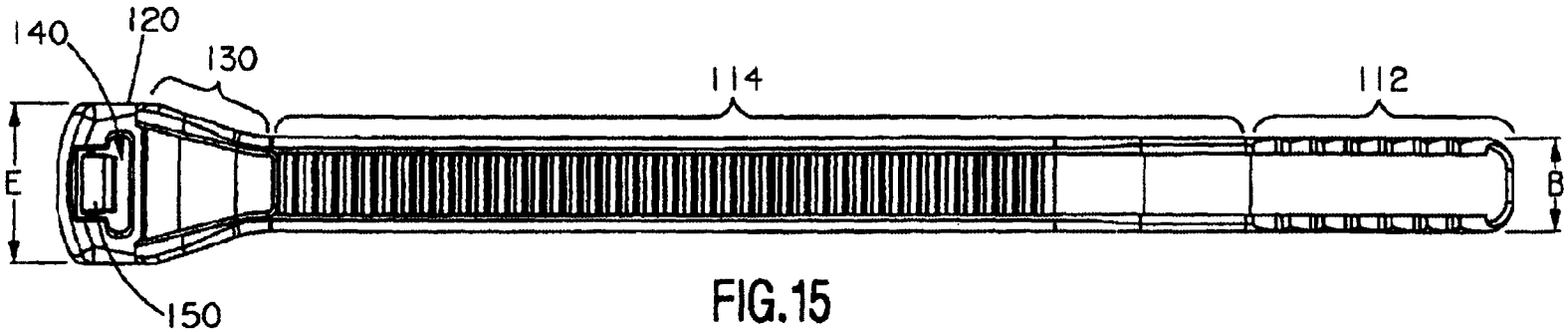
FIG. 15 is a top view of a bent neck type cable tie according to a first preferred embodiment of the invention.
Figure 16:
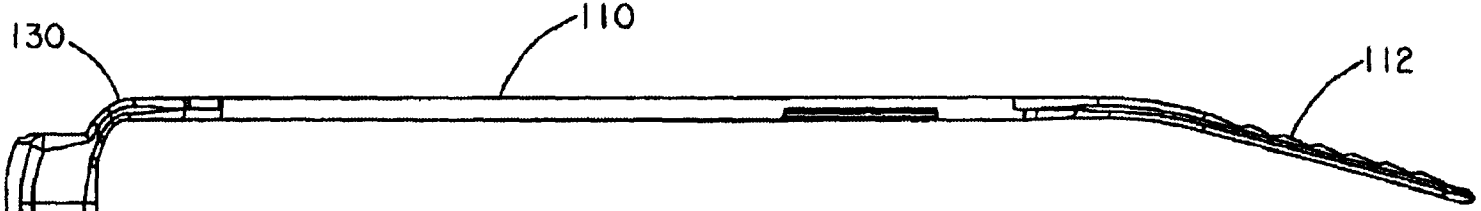
FIG. 16 is a side view of the bent neck type cable tie of FIG. 15.
Figure 17:
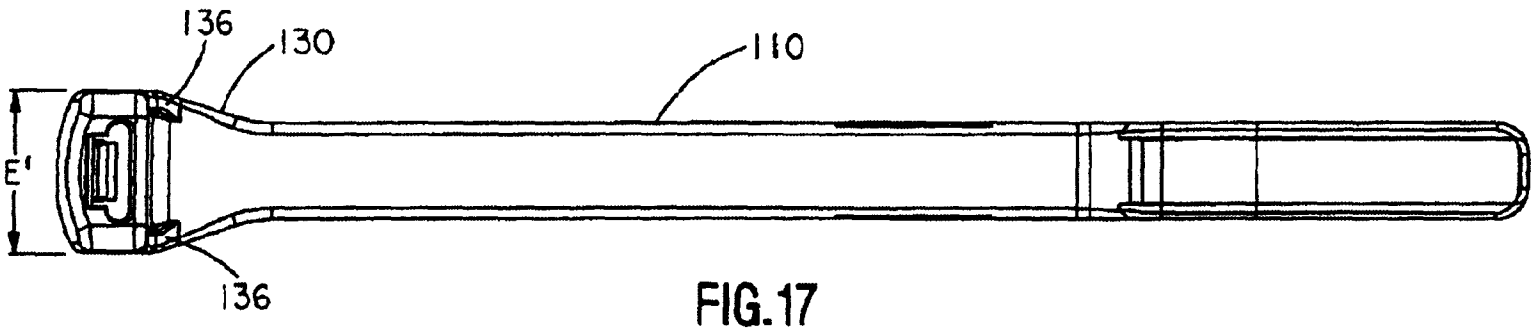
FIG. 17 is a bottom view of the bent neck type cable tie of FIG. 15.

In FIG. 11, the neck region 130 of the strap 110 is both wider than narrower than the strap, while having substantially the same cross-sectional area as the strap cross-section. In FIG. 12, a channel region 132 is cut from the lower surface of the strap so as to define a reduced thickness center portion (thickness $T_2$) and side portions 136 having thickness $T_3$. In FIG. 13, a channel region 134 is cut from the upper surface of the strap so as to define a reduced thickness center portion (thickness $T_2$) and increased thickness side portions 138 similar to that in FIG. 12. In FIG. 14, both channels 132 and 134 are provided.

A first exemplary bent neck type cable tie incorporating these principles is shown in FIGS. 15-19. These cable ties are molded from various materials, such as nylon, polypropylene, and other various fluoropolymers. Such cable ties can be molded in various sizes and lengths to suit a particular application as also known in the art Moreover, these cable ties can be either one-piece or two-piece cable ties having either an integral locking device or a separate metal locking device as known in the art. This exemplary cable tie 100 includes a cable tie strap 110 having a first end forming a neck section 130, an intermediate section 114 of a substantially uniform width B, and a free end 112. The first end (neck section 130) of strap 110 is molded to a cable tie head 120 having a substantially constant width E. Neck section 130 transitions from the narrower strap width B to a width E' that is substantially the same as the width of cable tie head 120. Cable tie 100 also includes a strap accepting channel 140 having a strap locking device 150. Locking device 150 either is a unitary member (one-piece cable tie) that mates with one or more teeth 116 provided on strap 110 or is a separate metal locking device formed of a material such as stainless steel that bites into the softer strap material to hold the strap in place and resist removal.

Figure 18:
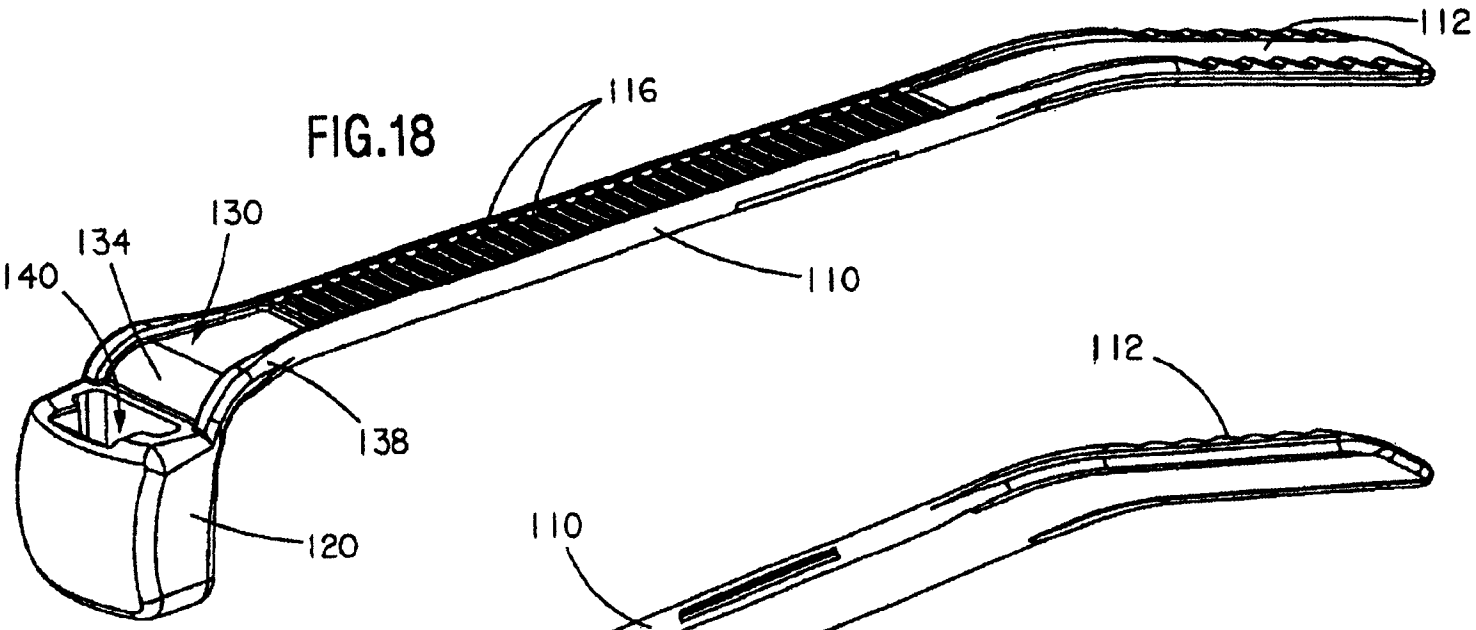
FIG. 18 is a top perspective view of the bent neck type cable tie of FIG. 15.
Figure 19:
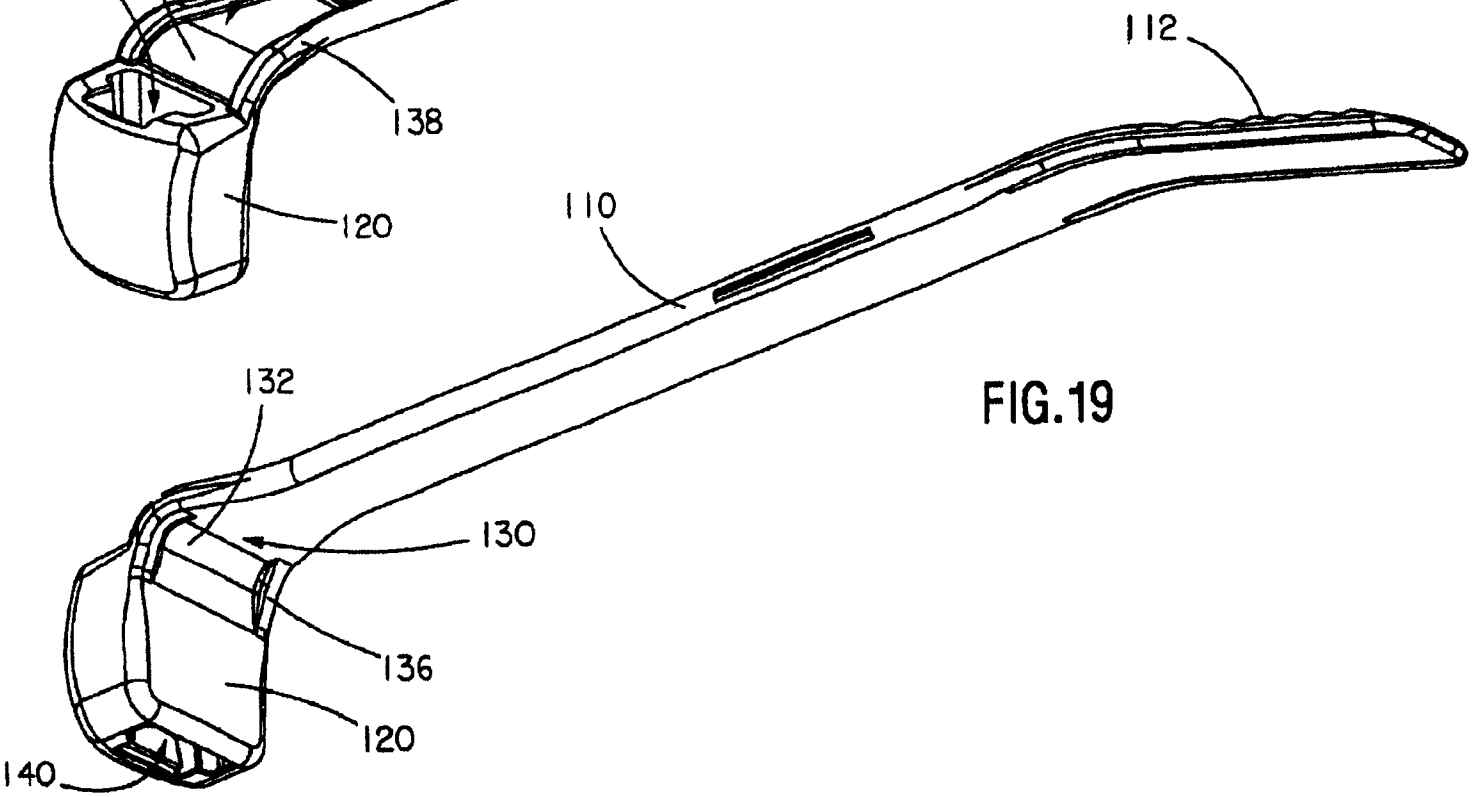
FIG. 19 is a bottom perspective view of the bent neck type cable tie of FIG. 15.
Figure 20:
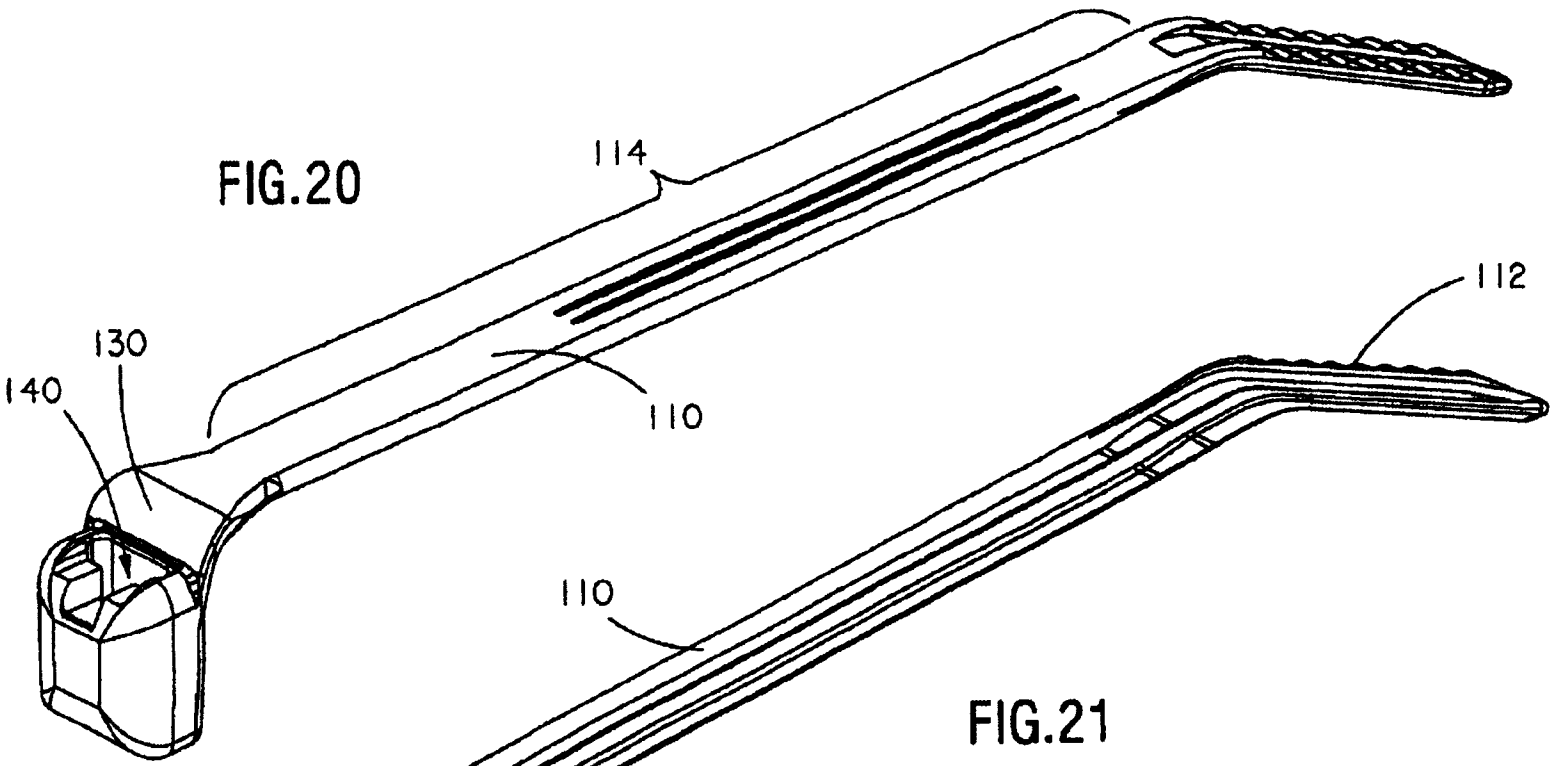
FIG. 20 is a top perspective view of a bent neck type cable tie according to a second preferred embodiment of the invention.

As best shown in FIGS. 18-19, neck section 130 tapers to substantially match the outer contour and width E of the cable head 120. Neck section 130 in this embodiment has a cross-section similar to the one shown in FIG. 14, in which both an upper groove 134 and a lower groove 132 are formed in the neck section to provide a reduced thickness compared to thickened side portions 136 and 138 which may have a thickness substantially the same as the thickness of the intermediate section of strap 110. However, as the width of neck section 130 has increased from a width B to a width of E', the total cross-sectional area at a point of flexure is substantially the same as strap 110. As such, the neck section 130 can achieve the same or even better tensile strength as the strap 110 itself while improving flexibility at neck section 130 by lowering the moment of inertia. This is important in a bent neck type cable tie as the bending forces during flexure of the cable tie are concentrated at neck section 130.

Applicants have also found manufacturing advantages to increasing the width of the strap at the neck section to match the width of the cable tie head. This provides the most desirable tooling configuration for a stepped parting line part, which can be used to create bent neck type cable ties such as those of the claimed invention. Moreover, by provision of the thickened side portions 136 and 138, a larger flow path is provided between the cable tie head and strap for the purpose and advantage of more readily filling a molded part during molding. This is helpful in assuring adequate material flow during injection molding through the neck section 130, which due to the reduced thickness may otherwise prevent adequate material flow to achieve reliable and consistent molding.

Further, a neck width that matches the head width eliminates the need for weak or complicated mold components that could wear or break to eliminate mismatch and sharp corners on the plastic part. Such a design in which a neck width matches the head width also eliminates a traditional stress concentration where there is an abrupt change in cross-section.

Figure 21:
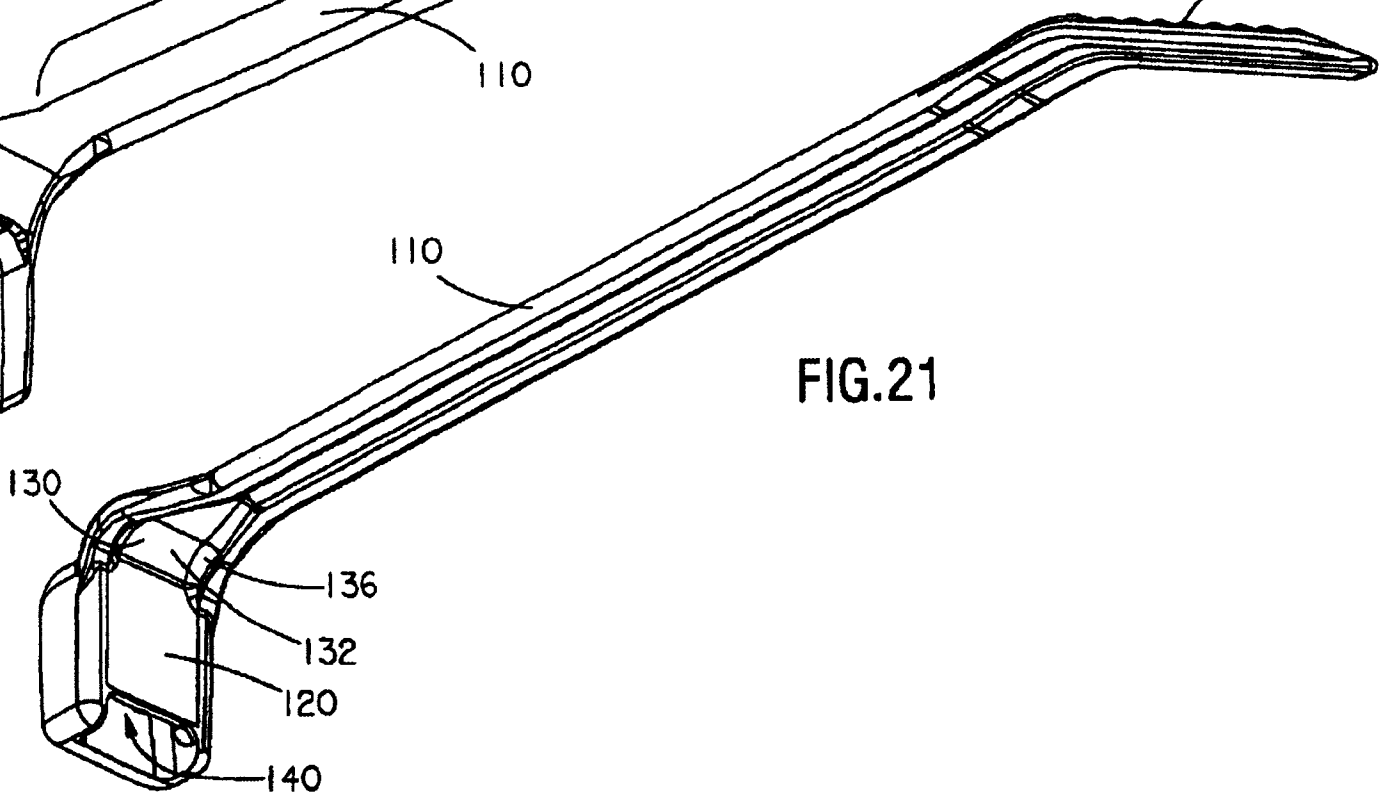
FIG. 21 is a bottom perspective view of the bent neck type cable tie of FIG. 20.
Figure 22:
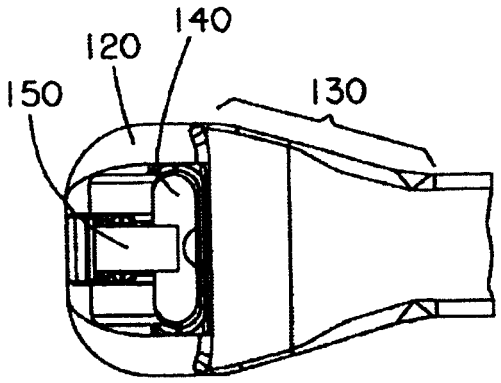
FIG. 22 is a partial top view of the bent neck type cable tie of FIG. 20.
Figure 23:
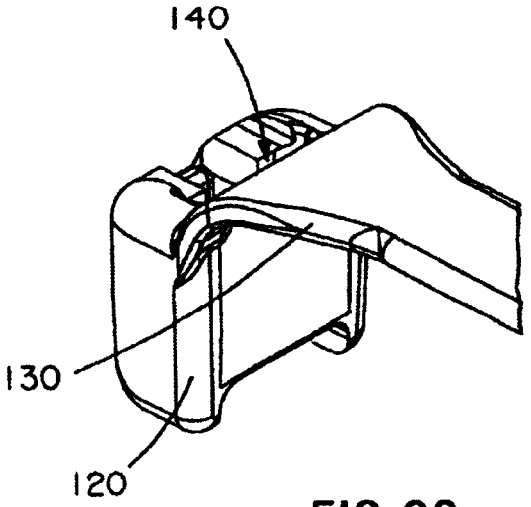
FIG. 23 is a partial perspective view of the bent neck type cable tie of FIG. 22.
Figure 24:
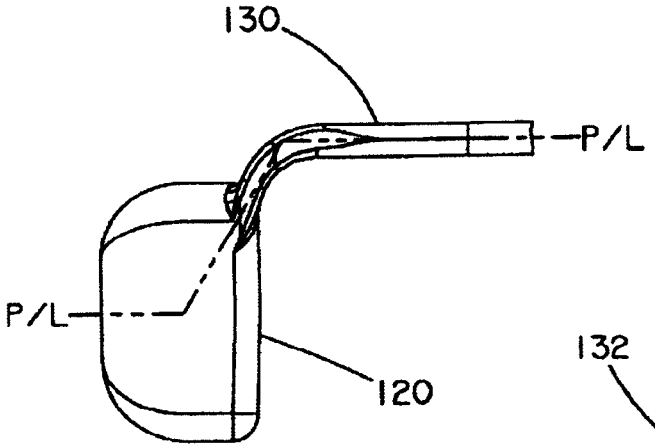
FIG. 24 is a partial side view of the bent neck type cable tie of FIG. 20 showing a mold parting line.
Figure 25:
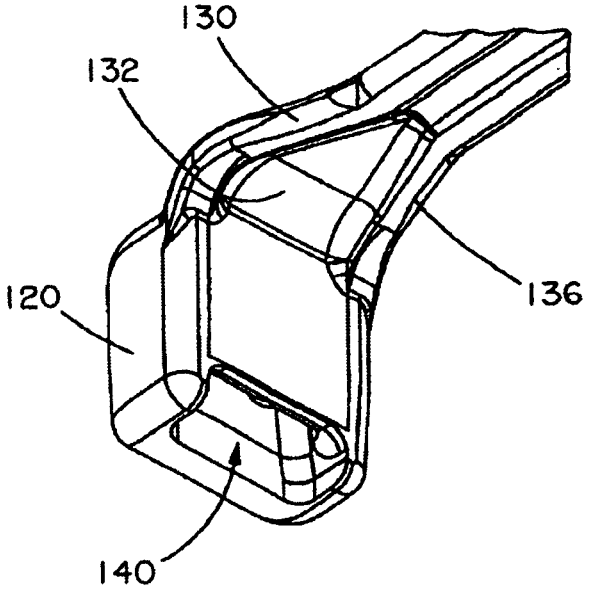
FIG. 25 is another perspective view of the bent neck type cable tie of FIG. 22 showing the bottom side of the neck area

Another exemplary bent neck type cable tie is shown in FIGS. 20-25. In this embodiment, neck section 130 also transitions from a width of B to a width E' that is substantially the same as the width E of cable tie head 120. However, neck section 130 has a cross-section similar to that shown in FIG. 12 in which a cored out channel 132 is formed on the lower side only, leaving thickened side portions 136 on the lower side. This results in a lower moment of inertia. Preferably, the channel 132 expands in width toward cable tie head 120 as shown in FIGS. 21 and 25 so that a substantially constant total cross-sectional area can be provided along the length of neck section 130 to maintain a desired tensile strength while increasing flexibility toward the first end of strap 110.

Figure 1:
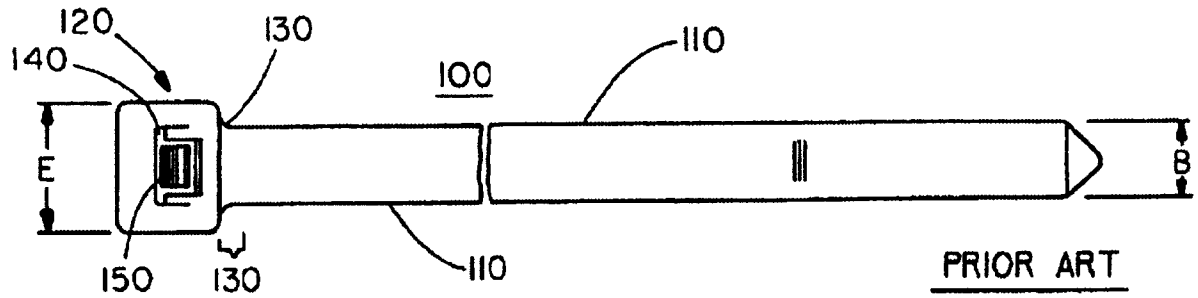
PRIOR ART FIG.1
FIG. 1 is a top view of a conventional prior art integral cable tie.
Figure 2:
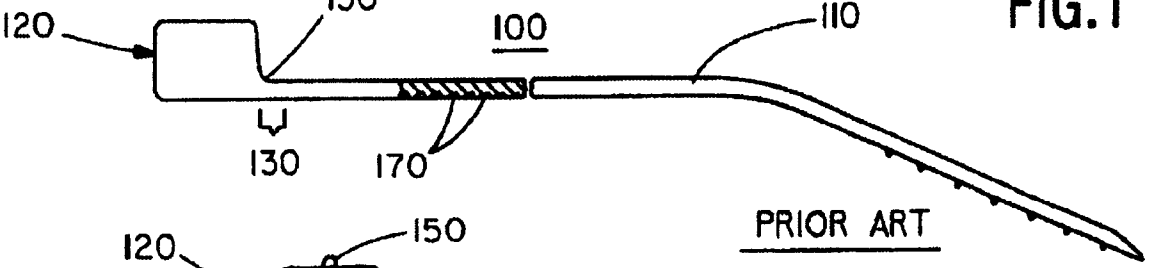
PRIOR ART FIG.2
FIG. 2 is a side view of the conventional cable tie of FIG. 1.
Figure 3:
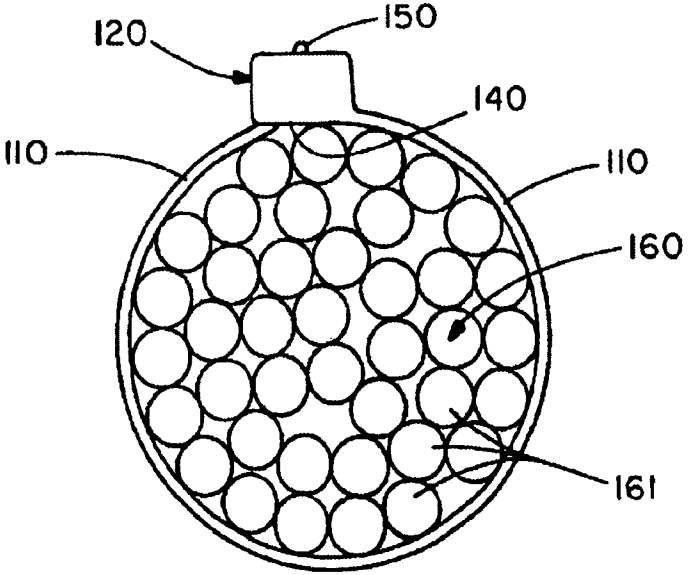
PRIOR ART FIG.3
FIG. 3 is a side view of the cable ties of FIGS. 1-2 shown in a locked state around a bundle of cables.
Figure 4:
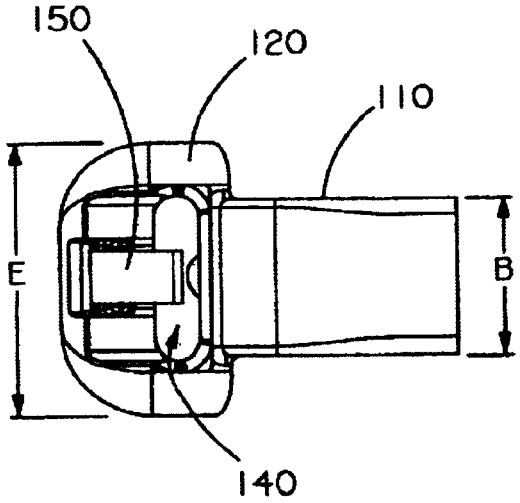
RELATED ART FIG.4
FIG. 4 is a partial top view of a known bent neck type cable tie.
Figure 5:
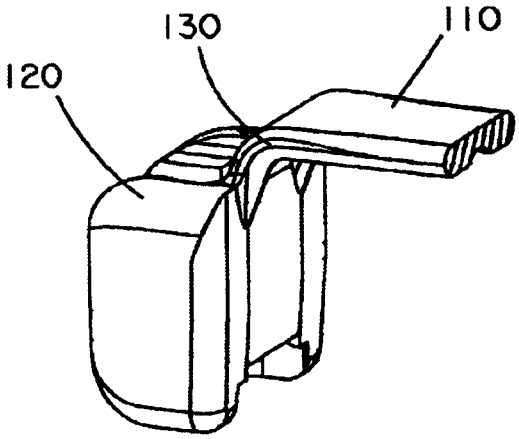
RELATED ART FIG.5
FIG. 5 is a partial perspective view of the known cable tie of FIG. 4.
Figure 6:
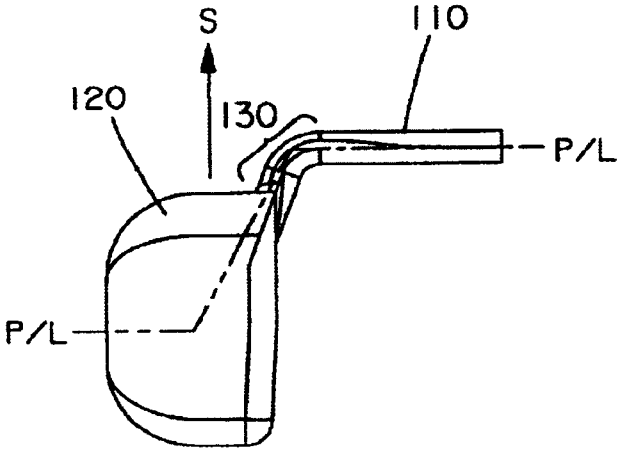
RELATED ART FIG.6
FIG. 6 is a partial side view of the known cable tie of FIG. 4 showing a mold parting line.
Figure 7:
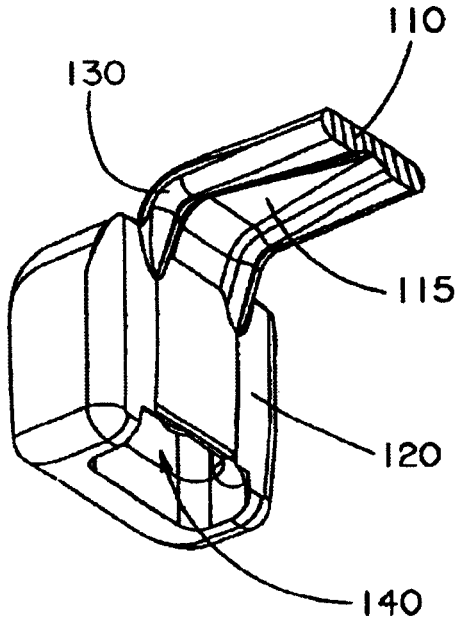
RELATED ART FIG.7
FIG. 7 is another perspective view of the known cable tie of FIG. 4.
Figure 8:
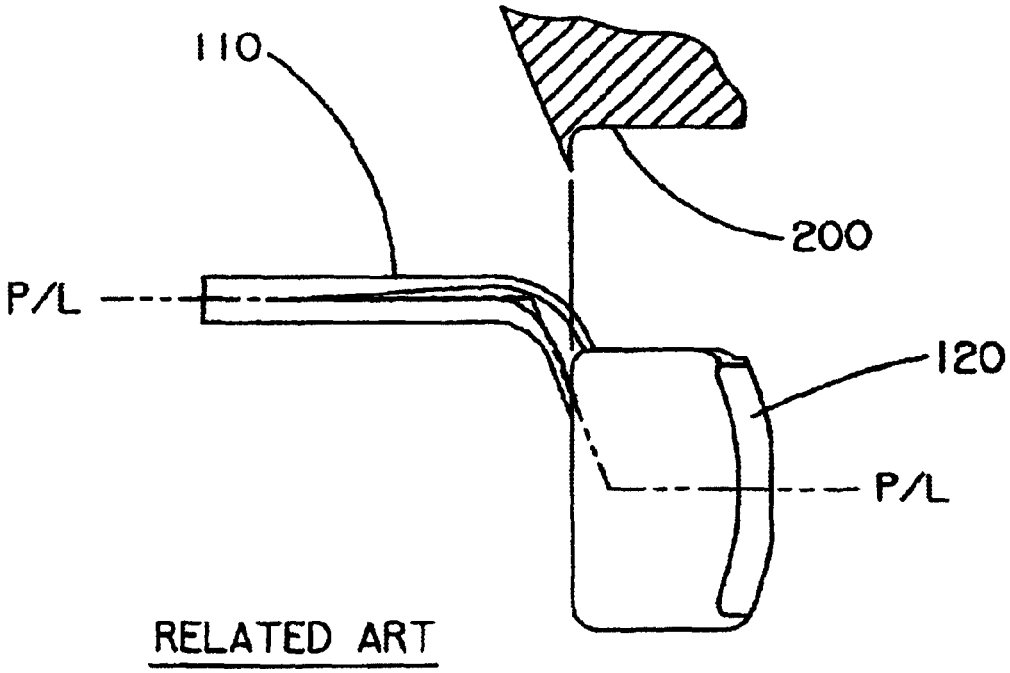
RELATED ART FIG.8
FIG. 8 is a side view of an alternate cable tie design similar to that shown of FIG. 4 showing both the mold parting line and a partial side view of a metal mold half necessary to form the corner profile at the neck area.
Figure 9:
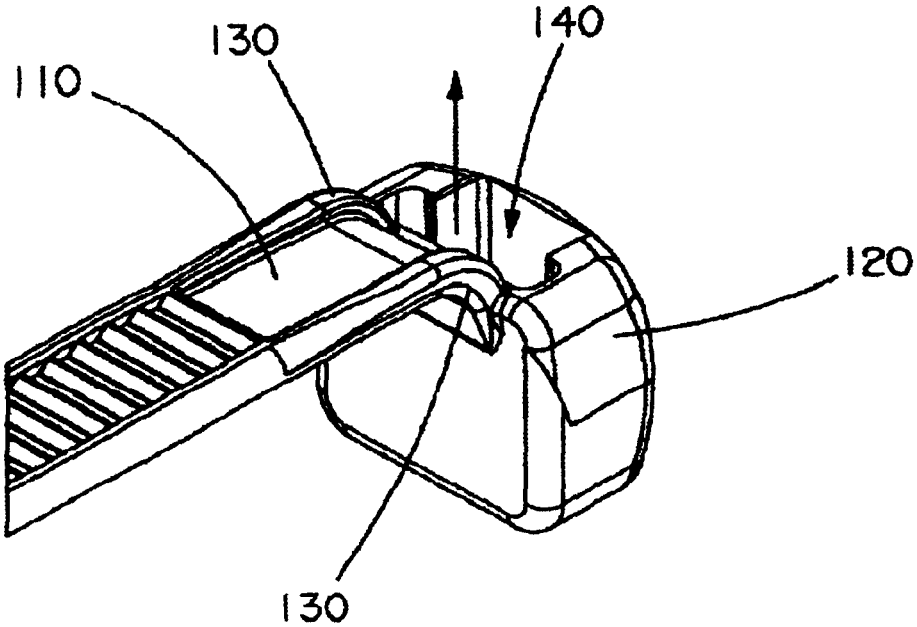
RELATED ART FIG.9
FIG. 9 is another perspective view of the known cable tie of FIG. 8.

As shown in FIG. 24, cable tie 100 is formed by a two-piece mold having a stepped part line (P/L) as shown in dashed line form. This part line P/L follows the midline of strap 110 around the bend of neck section 130 where the part line then angles down across cable head 120. With the wide tapered neck section 130, there are no sharp edges on the part as shown in FIGS. 4-7 or in the steel as shown in FIGS. 8-9. Moreover, by preventing a large step in cross-section from neck section 130 to cable head 120, stress risers and stress concentrations are minimized. Further, by the smooth transition, there is less chance of sharp edges that may damage or interfere with cabling during cable tie use. Along with all of these advantages is a neck section that achieves increased flexibility and maintains tensile strength.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

[1. A cable tie, comprising:

a strap including a first end forming a neck section including an angular bend of approximately 90°, a free end opposite the first end, and an intermediate section between the first end and the free end, the intermediate section having a predetermined width B and thickness $T_1$ defining a predetermined cross-sectional area;

a cable tie head secured to the neck section of the strap at the first end of the strap, the cable tie head having a width E that is wider than strap width B and including a strap accepting channel containing a locking device, the strap accepting channel being sized to receive the free end of the strap, wherein the neck section has a width that transitions from the width B to a width E' that is substantially the same as width E and a thickness $T_2$ that is thinner than $T_1$, the neck section having a cross-sectional area that is at least substantially equal to the cross-sectional area of the intermediate section of the strap so as to have a tensile strength at least equal to a tensile strength of the intermediate section of the strap.]

[2. The cable tie of claim 1, wherein the strap accepting channel of the cable tie head is oriented along an axis substantially perpendicular to the intermediate section of the strap.]

[3. The cable tie of claim 1, wherein the cross-section of the neck section includes at least one reduced thickness channel of thickness $T_2$ and thickened side portions of a thickness $T_3$, that is greater than $T_2$.]

[4. The cable tie of claim 3, wherein the at least one reduced thickness channel is provided on an outer side of the neck section.]

[5. The cable tie of claim 3, wherein the at least one reduced thickness channel increases in width from the intermediate section of the strap to the cable tie head.]

[6. The cable tie of claim 5, wherein the increase in width of the at least one reduced thickness channel is proportional to the increased width of the neck section.]

[7. A cable tie, comprising:

a strap including a first end forming a neck section, a free end opposite the first end, and an intermediate section between the first end and the free end, the intermediate section having a predetermined width B and thickness $T_1$ defining a predetermined cross-sectional area;

a cable tie head secured to the neck section of the strap at the first end of the strap, the cable tie head having a width E that is wider than strap width B and including a strap accepting channel containing a locking device, the strap accepting channel being sized to receive the free end of the strap, wherein the neck section has a width that transitions from the width B to a width E' that is substantially the same as width E and a thickness $T_2$ that is thinner than $T_1$, the neck section having a cross-sectional area that is at least substantially equal to the cross-sectional area of the intermediate section of the strap so as to have a tensile strength at least equal to a tensile strength of the intermediate section of the strap, wherein the cross-section of the neck section includes at least one reduced thickness channel of thickness $T_2$ on an inner side of the neck section and thickened side portions of a thickness $T_3$ that is greater than $T_2$.]

8. A cable tie, comprising:

a strap including a first end forming a neck section, a free end opposite the first end, and an intermediate section between the first end and the free end, the intermediate section having a predetermined width B and thickness $T_1$ defining a predetermined cross-sectional area;

a cable tie head secured to the neck section of the strap at the first end of the strap, the cable tie head having a width E that is wider than strap width B and including a strap accepting channel containing a locking device, the strap accepting channel being sized to receive the free end of the strap, wherein the neck section has a width that transitions from the width B to a width E' that is substantially the same as width E and a thickness $T_2$ that is thinner than $T_1$, the neck section having a cross-sectional area that is at least substantially equal to the cross-sectional area of the intermediate section of the strap so as to have a tensile strength at least equal to a tensile strength of the intermediate section of the strap, wherein the cross-section of the neck section includes at least one reduced thickness channel of thickness $T_2$ and thickened side portions of a thickness $T_3$ that is greater than $T_2$, wherein the at least one reduced thickness channel includes a first channel formed on an inner side of the neck section and a second channel formed on an outer side of the neck section.

*9. A cable tie, comprising:*

*a strap including a first end forming a neck section including an angular bend of approximately 90°, a free end opposite the first end, and an intermediate section between the first end and the free end, the intermediate section having a predetermined width B and thickness $T_1$ defining a predetermined cross-sectional area;*

*a cable tie head secured to the neck section of the strap at the first end of the strap, the cable tie head having a width E that is wider than strap width B and including a strap accepting channel containing a locking device, the strap accepting channel being sized to receive the free end of the strap,*

*wherein the neck section has a width that transitions so as to continuously increase from the width B to a width E' that is substantially the same as width E, and a thickness $T_2$ that is thinner than $T_1$, all of the neck section having a cross-sectional area that is at least substantially equal to the cross-sectional area of the intermediate section of the strap so as to have a tensile strength at least equal to a tensile strength of the intermediate section of the strap.*

*10. The cable tie of claim 9, wherein the strap accepting channel of the cable tie head is oriented along an axis substantially perpendicular to the intermediate section of the strap.*

*11. The cable tie of claim 9, wherein the cross-section of the neck section includes at least one reduced thickness channel of thickness $T_2$ and thickened side portions of a thickness $T_3$, that is greater than $T_2$, and the thickened side portions extend from the intermediate section to the cable tie head such that a length of the thickened side portions is substantially the same as a length of the neck section.*

*12. The cable tie of claim 11, wherein the at least one reduced thickness channel is provided on an outer side of the neck section or an inner side of the neck section.*

*13. The cable tie of claim 11, wherein the at least one reduced thickness channel increases in width from the intermediate section of the strap to the cable tie head.*

*14. The cable tie of claim 13, wherein the increase in width of the at least one reduced thickness channel is proportional to the increased width of the neck section.*

*15. The cable tie of claim 9, wherein the cross-sectional area of the neck section includes at least one reduced thickness channel, and the strap accepting channel of the cable tie head is separated from the at least one reduced thickness channel.*

*16. The cable tie of claim 9, wherein the cross-sectional area of the neck section is substantially constant along the length of the neck section.*

*17. The cable tie of claim 9, wherein the width B of the intermediate section is substantially equal to a minimum width of the neck section and the width E' of the neck section is substantially a maximum width of the neck section.*

*18. The cable tie of claim 9, wherein the neck section has a point of flexure, the cross-sectional area of the neck section at the point of flexure is substantially the same as the cross-sectional area of the intermediate section.*

*19. A cable tie, comprising:*

*a strap including a first end forming a neck section, a free end opposite the first end, and an intermediate section between the first end and the free end, the intermediate section having a predetermined width B and thickness $T_1$ defining a predetermined cross-sectional area;*

*a cable tie head secured to the neck section of the strap at the first end of the strap, the cable tie head having a width E that is wider than strap width B and including a strap accepting channel containing a locking device, the strap accepting channel being sized to receive the free end of the strap, wherein*

*the neck section has a width that transitions from the width B to a width E' that is substantially the same as width E and a thickness T2 that is thinner than T1,*

*the neck section has a cross-sectional area substantially constant along a length of the neck section, and that is at least substantially equal to the cross-sectional area of the intermediate section of the strap so as to have a tensile strength at least equal to a tensile strength of the intermediate section of the strap, and*

*the cross-section of the neck section includes at least one reduced thickness channel of thickness $T_2$ on an inner side of the neck section and thickened side portions of a thickness $T_3$ that is greater than $T_2$.*

*20. The cable tie of claim 19, wherein the thickened side portions extend from the intermediate section of the strap to the cable tie head such that a length of the thickened side portions is substantially the same as the length of the neck section.*

*21. The cable tie of claim 19, wherein another reduced thickness channel is provided on an outer side of the neck section.*

*22. The cable tie of claim 19, wherein the at least one reduced thickness channel increases in width from the intermediate section of the strap to the cable tie head.*

*23. The cable tie of claim 22, wherein the width of the neck section increases from the width B to the width E' proportional to the increase in width of the at least one reduced thickness channel.*

*24. The cable tie of claim 19, wherein the strap accepting channel of the cable tie head is separated from the at least one reduced thickness channel.*

*25. The cable tie of claim 19, wherein the width B of the intermediate section of the strap is substantially equal to a minimum width of the neck section and the width E' of the neck section is substantially a maximum width of the neck section.*

*26. The cable tie of claim 19, wherein the neck section has a point of flexure, the cross-sectional area of the neck section at the point of flexure is substantially the same as the cross-sectional area of the intermediate section.*

* * * * *